(12) United States Patent
Miura et al.

(10) Patent No.: US 8,306,430 B2
(45) Date of Patent: Nov. 6, 2012

(54) DISPERSION COMPENSATING APPARATUS AND DISPERSION COMPENSATING METHOD

(75) Inventors: Akira Miura, Kawasaki (JP); Hiroki Ooi, Kawasaki (JP); Kiyotoshi Noheji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 523 days.

(21) Appl. No.: 12/292,956

(22) Filed: Dec. 1, 2008

(65) Prior Publication Data

US 2009/0080901 A1 Mar. 26, 2009

Related U.S. Application Data

(63) Continuation of application No. PCT/JP2006/310725, filed on May 30, 2006.

(51) Int. Cl.
*H04B 10/00* (2006.01)

(52) U.S. Cl. ........................................ 398/147

(58) Field of Classification Search ................... 398/147
See application file for complete search history.

(56) References Cited

U.S. PATENT DOCUMENTS

| | | | | |
|---|---|---|---|---|
| 6,049,413 | A * | 4/2000 | Taylor et al. | 359/337 |
| 6,363,187 | B1 * | 3/2002 | Fells et al. | 385/37 |
| 6,889,347 | B1 * | 5/2005 | Adams et al. | 714/704 |
| 7,218,856 | B2 * | 5/2007 | Takahara et al. | 398/81 |
| 7,366,422 | B2 * | 4/2008 | Sekiya et al. | 398/147 |
| 7,418,206 | B2 * | 8/2008 | Kawahata | 398/81 |
| 2002/0089724 | A1 * | 7/2002 | Nishimoto et al. | 359/161 |
| 2002/0123851 | A1 * | 9/2002 | Kurooka et al. | 702/69 |
| 2004/0114936 | A1 * | 6/2004 | Sugihara et al. | 398/147 |
| 2004/0141756 | A1 * | 7/2004 | Nakamura et al. | 398/147 |
| 2005/0047786 | A1 * | 3/2005 | Kawahata | 398/81 |
| 2005/0244164 | A1 * | 11/2005 | Miyashita et al. | 398/147 |
| 2006/0098988 | A1 * | 5/2006 | Sekiya et al. | 398/147 |
| 2009/0080901 | A1 * | 3/2009 | Miura et al. | 398/158 |
| 2009/0136239 | A1 * | 5/2009 | Izumi | 398/147 |

FOREIGN PATENT DOCUMENTS

| | | |
|---|---|---|
| JP | 2001-99709 | 4/2001 |
| JP | 2002-208892 | 7/2002 |
| JP | 2002-261692 | 9/2002 |
| JP | 2003-224523 | 8/2003 |
| JP | 2004-222060 | 8/2004 |
| JP | 2005-77969 | 3/2005 |
| JP | 2005-318474 | 11/2005 |

OTHER PUBLICATIONS

International Search Report for PCT/JP2006/310725, mailed Jun. 27, 2006.

* cited by examiner

*Primary Examiner* — Danny Leung
(74) *Attorney, Agent, or Firm* — Staas & Halsey LLP

(57) ABSTRACT

In a dispersion compensating apparatus, a reference identifying unit identifies a reference (X dB down) that makes a penalty lower than a predetermined value in accordance with optical signal information and a reference identifying table, and a VIPA plate temperature adjusting unit adjusts a refractive index of a VIPA plate by modifying a temperature of the VIPA plate so that a transmission center wavelength derived from the reference matches the wavelength defined by an ITU-T Grid. If a dispersion compensation value setting unit performs an optimal residual dispersion value search, the VIPA plate temperature adjusting unit determines if a filtering penalty is lower than a predetermined value in accordance with a penalty management table. If the filtering penalty is lower than the predetermined value, temperature adjustment of the VIPA plate is not performed.

8 Claims, 16 Drawing Sheets

MIRROR POSITION ADJUSTING TABLE
151

| DISPERSION COMPENSATION VALUE [ps/nm] | POSITIONS OF FREE-FORM SURFACE MIRROR [nm] |
|---:|---:|
| -1200 | OOOO |
| -800 | OOOO |
| -400 | OOOO |
| 0 | OOOO |
| 400 | OOOO |
| 800 | OOOO |
| 1200 | OOOO |
| ⋮ | ⋮ |

FIG.8

VIPA TEMPERATURE SETTING IDENTIFYING TABLE 154

| DISPERSION COMPENSATION VALUE [ps/nm] | VIPA PLATE TEMPERA-TURE | OUTSIDE AIR TEMPERA-TURE | FLUCTUATION VALUE BETWEEN ITU-T Grid AND TRANSMISSION CENTER WAVELENGTH (6 dB DOWN) | VIPA TEMPERATURE |
|---|---|---|---|---|
| -1200 | 80°C | 25°C | Δλ1 (25°C, -1200) | 80°C+Δλ1×A |
| -800 | 80°C | 25°C | Δλ2 (25°C, -800) | 80°C+Δλ2×A |
| -400 | 80°C | 25°C | Δλ3 (25°C, -400) | 80°C+Δλ3×A |
| 0 | 80°C | 25°C | Δλ4 (25°C, 0) | 80°C+Δλ4×A |
| 400 | 80°C | 25°C | Δλ5 (25°C, 400) | 80°C+Δλ5×A |
| 800 | 80°C | 25°C | Δλ6 (25°C, 800) | 80°C+Δλ6×A |
| 1200 | 80°C | 25°C | Δλ7 (25°C, 1200) | 80°C+Δλ7×A |
| ... | ... | ... | ... | ... |

FIG.9

FLUCTUATION VALUE CORRECTION TABLE
155

| OUTSIDE AIR TEMPERATURE | DISPERSION COMPENSATION VALUE [ps/nm] | FLUCTUATION VALUE BETWEEN ITU-T Grid AND TRANSMISSION CENTER WAVELENGTH (6 dB DOWN) |
|---|---|---|
| 10°C | -1200 | Δλ1-1 ( 10°C, -1200 ) |
| 20°C | -1200 | Δλ1-2 ( 20°C, -1200 ) |
| 30°C | -1200 | Δλ1-3 ( 30°C, -1200 ) |
| 40°C | -1200 | Δλ1-4 ( 40°C, -1200 ) |
| ⋮ | ⋮ | ⋮ |
| 10°C | 800 | Δλ2-1 ( 10°C, -800 ) |
| 20°C | 800 | Δλ2-2 ( 20°C, -800 ) |
| 30°C | 800 | Δλ2-3 ( 30°C, -800 ) |
| 40°C | 800 | Δλ2-4 ( 40°C, -800 ) |
| ⋮ | ⋮ | ⋮ |

FIG.10

PENALTY MANAGEMENT TABLE
156

| DISPERSION COMPENSATION VALUE [ps/nm] | FILTERING PENALTY | | | | |
|---|---|---|---|---|---|
| | Δλ-1 | Δλ-2 | Δλ-3 | Δλ-4 | ... |
| -1200 | x x x x | x x x x | x x x x | x x x x | ... |
| -800 | x x x x | x x x x | x x x x | x x x x | ... |
| -400 | x x x x | x x x x | x x x x | x x x x | ... |
| 0 | x x x x | x x x x | x x x x | x x x x | ... |
| 400 | x x x x | x x x x | x x x x | x x x x | ... |
| 800 | x x x x | x x x x | x x x x | x x x x | ... |
| 1200 | x x x x | x x x x | x x x x | x x x x | ... |
| ⋮ | ⋮ | ⋮ | ⋮ | ⋮ | ⋮ |

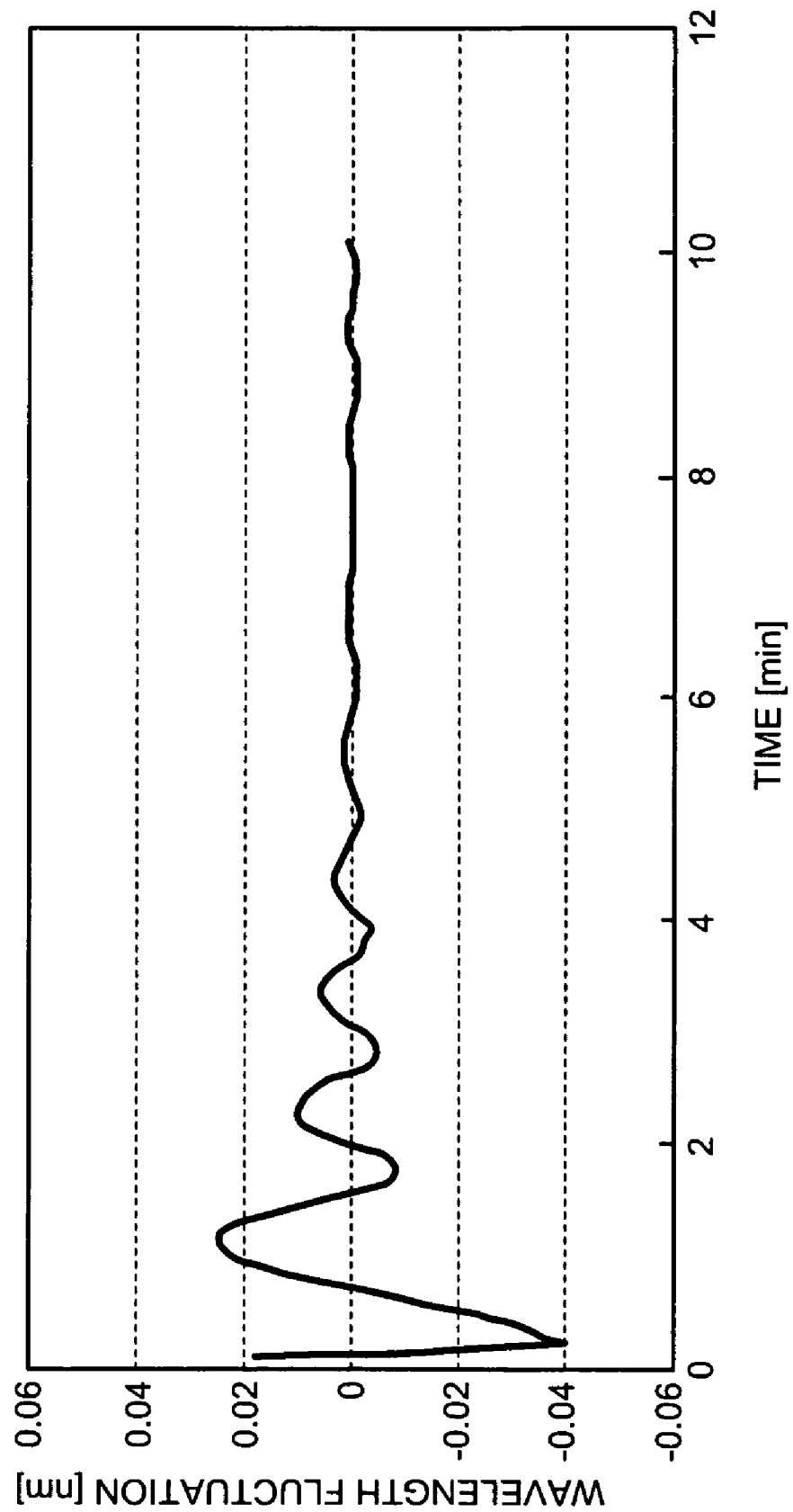

DISPERSION COMPENSATING APPARATUS AND DISPERSION COMPENSATING METHOD

CROSS REFERENCE TO RELATED APPLICATIONS

This is a continuing application, filed under 35 U.S.C. §111(a), of International Application PCT/JP2006/310725, filed May 30, 2006, the contents of which are incorporated herein by reference.

BACKGROUND OF THE INVENTION

1. Field of the Invention

The present invention relates to a dispersion compensating apparatus that compensates waveform degradation that occurs in an optical signal due to dispersion characteristics of an optical transmission line by using an optical component that changes transmission wavelength characteristics of the optical signal with a refractive index changing member that modifies, for example, temperature or stress applied on the optical component.

2. Description of the Related Art

In recent years, the Internet is widely used, and as a result, there is a demand for higher capacity and higher speed technologies in an optical communication system. Because of the demand, a communication speed in an optical communication system has already reached 10 Gb/s at the present day, and development of a next-generation optical communication system is currently underway so that a communication speed reaches 40 Gb/s.

If the communication speed, however, reaches 40 Gb/s, wavelength dispersion of light propagating through an optical fiber can not be neglected, and for example, a waveform of signal light is distorted due to the wavelength dispersion, thereby increasing an error rate (penalty) of the signal light. Conventionally, to compensate wavelength dispersion, dispersion compensators such as a virtually imaged phased array (VIPA) dispersion compensator are used.

FIG. 15 is a schematic of a configuration of a VIPA dispersion compensator. In FIG. 15, optical signal whose dispersion is compensated is input to a condenser lens system 11 via an optical circulator 10, and then is input to a VIPA plate 12. The optical signal is reflected multiply on the VIPA plate 12. More specifically, the optical signal is output from the VIPA plate 12 so that the optical signal is reflected in different directions in accordance with each wavelength thereof. The optical signal thus output from the VIPA plate 12 reaches a free-form surface mirror (or free surface mirror) 14 via a focusing lens 13. The free-form surface mirror 14 reflects the optical signal and the optical signal enters again into the VIPA plate 12. At the VIPA plate 12, the number of how many times the optical signal is reflected multiply differs in accordance with the position at which the optical signal enters the VIPA plate 12. Thus, the optical signal returns to the condenser lens system 11 so that a path difference thereof differs in accordance with a wavelength thereof.

As a result, by fluctuating the reflectance characteristic of the free-form surface mirror 14 that is by altering the position at which the optical signal reflects on the free-form surface mirror 14, a desired dispersion compensation value can be obtained. For example, if the free-form surface mirror 14 reflects an entering optical signal in a concave region thereof, a dispersion compensation value is positive. If the free-form surface mirror 14 reflects the optical signal in a convex region thereof, the dispersion compensation value has a negative value.

In a VIPA dispersion compensator, transmission characteristics of an optical signal are asymmetrical with respect to the loss axis of the optical signal. Therefore, a transmission center wavelength differs little by little in accordance with dispersion compensation values. As a result, in the VIPA dispersion compensator, a transmission wavelength needs to be adjusted for each dispersion compensation value. In Japanese Patent Application Laid-open No. 2005-77969, a method for adjusting a transmission wavelength by adjusting a temperature of the VIPA plate 12, each time the dispersion compensation value is altered, to alter the refractive index of the VIPA plate 12 is applied. In Japanese Patent Application Laid-open No. 2001-99709, a fiber bragg grating (FBG) is used as a dispersion compensator other than a VIPA dispersion compensator.

In the conventional technologies, wavelength dispersion that occurs in an optical signal cannot be efficiently compensated.

More specifically, if the transmission characteristic of the optical signal is asymmetrical with respect to the loss axis as in a VIPA dispersion compensator, a transmission wavelength thereof needs to be an optimal value for the optical signal (that is a wavelength so that a penalty of the optical signal is the smallest). The optimal value, however, fluctuates in accordance with a bit rate and a modulation method of the optical signal. Therefore, depending on a type of the signal light, the transmission wavelength characteristic is not necessarily optimal. As a result, wavelength dispersion thereof cannot be efficiently compensated.

In a method disclosed in Japanese Patent Application Laid-open No. 2005-77969 in which a temperature of the VIPA plate 12 is adjusted each time the dispersion compensation value is modified, it takes minutes until the transmission wavelength is stably controlled by adjusting the temperature of the VIPA plate 12. Thus, the wavelength dispersion cannot be compensated until the transmission wavelength gets stable. FIG. 16 is a diagram of a relationship between fluctuation of the wavelength and time when a temperature of the VIPA plate 12 is adjusted. As shown in FIG. 16, it will be appreciated that it takes about 5 minutes until the transmission wavelength is stably controlled by adjusting a temperature of the VIPA plate 12.

SUMMARY

It is an object of the present invention to at least partially solve the problems in the conventional technology.

According to an aspect of the present invention, a dispersion compensating apparatus that compensates waveform degradation that occurs in an optical signal due to a dispersion characteristic of an optical transmission line by using an optical component that modifies a refractive index thereof with a change in one of temperature and stress applied thereon and changes a transmission wavelength characteristic of the optical signal, includes a reference value information recording unit that records therein reference value information indicating a relationship between characteristics of the optical signal and a reference value that makes an error rate of the optical signal lower than a predetermined value, and a refractive index adjusting unit that identifies a reference value in accordance with the characteristics of the optical signal whose wavelength is compensated and the reference value information, and adjusts the refractive index of the optical component in accordance with the identified reference value.

According to another aspect of the present invention, a dispersion compensating apparatus that compensates waveform degradation that occurs in an optical signal due to a dispersion characteristic of an optical transmission line by using an optical component that modifies a refractive index thereof with a change in one of temperature and stress applied thereon and changes a transmission wavelength characteristic of the optical signal, includes an error rate information recording unit that records therein error rate information that represents an error rate of the optical signal if a refractive index of the optical component is not adjusted when a dispersion compensation value that represents a degree of compensation of waveform degradation of the optical signal is modified, and a refractive index adjustment determining unit that determines if the refractive index of the optical component is adjusted in accordance with the dispersion compensation value and the error rate information when the dispersion compensation value is modified.

According to still another aspect of the present invention, a dispersion compensating method that compensates waveform degradation that occurs in an optical signal due to a dispersion characteristic of an optical transmission line by using an optical component that modifies a refractive index thereof with a change in one of temperature and stress applied thereon and changes a transmission wavelength characteristic of the optical signal, includes recording reference value information indicating a relationship between characteristics of the optical signal and a reference value that makes an error rate of the optical signal lower than a predetermined value, identifying a reference value in accordance with the characteristics of the optical signal whose wavelength is compensated and the reference value information, and adjusting the refractive index of the optical component in accordance with the identified reference value.

According to still another aspect of the present invention, a dispersion compensating method that compensates waveform degradation that occurs in an optical signal due to a dispersion characteristic of an optical transmission line by using an optical component that modifies a refractive index thereof with a change in one of temperature and stress applied thereon and changes a transmission wavelength characteristic of the optical signal, includes recording error rate information that represents an error rate of the optical signal if a refractive index of the optical component is not adjusted when a dispersion compensation value that represents a degree of compensation of waveform degradation of the optical signal is modified, and determining if the refractive index of the optical component is adjusted in accordance with the dispersion compensation value and the error rate information when the dispersion compensation value is modified.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram of an example of a VIPA temperature setting identifying table shown in FIG. 2;

FIG. 9 is a diagram of an example of a fluctuation value correction table shown in FIG. 2;

FIG. 10 is a diagram of an example of a penalty management table shown in FIG. 2;

FIG. 16 is a diagram of a relationship between fluctuation of a wavelength and time when a temperature of a VIPA plate is adjusted.

DETAILED DESCRIPTION OF THE PREFERRED EMBODIMENTS

Exemplary embodiments of a dispersion compensating apparatus according to the present invention are described below in greater detail with reference to the accompanying drawings. The present invention, however, is not limited thereto.

An overview and a characteristic feature of the dispersion compensating apparatus according to the present embodiment are described in greater detail. The dispersion compensating apparatus according to the present embodiment adjusts a refractive index of optical components such as a VIPA plate in accordance with reference value information that represents a relationship between information that represents characteristics of an optical signal such as a wavelength, a bit rate, a modulation method, a wavelength interval thereof (hereinafter, "optical signal information") and a reference value that makes an error rate (hereinafter, "penalty") generated by a dispersion compensation value set for the optical signal less than a predetermined value.

Thus, the dispersion compensating apparatus according to the present embodiment adjusts the refractive index in accordance with the optical signal information and the reference value information. Therefore, the dispersion compensating apparatus can be applied to various types of optical signals, and can efficiently compensate wavelength dispersion of the optical signal.

The dispersion compensating apparatus according to the present embodiment holds filtering error information that represents a penalty (hereinafter, "filtering penalty") due to an optical signal emitted from an optical component whose refractive index is not optimally adjusted when a dispersion compensating value for the optical signal is adjusted. When the dispersion compensation value is adjusted, the dispersion compensating apparatus determines, in accordance with the filtering error information, if a refractive index of the optical component needs to be adjusted. More specifically, the dispersion compensating apparatus determines not to adjust a refractive index of the optical component if a value of the filtering penalty is less than a predetermined value.

Thus, the dispersion compensating apparatus according to the present embodiment determines, in accordance with filtering error information, if a refractive index of optical component needs to be adjusted when the dispersion compensation value is adjusted. Therefore, unnecessary temperature adjustment can be omitted, that is, a time period until which a transmission wavelength is stably controlled by the temperature adjustment can be saved. As a result, the dispersion compensating apparatus can efficiently compensate wavelength dispersion.

Figure 1:
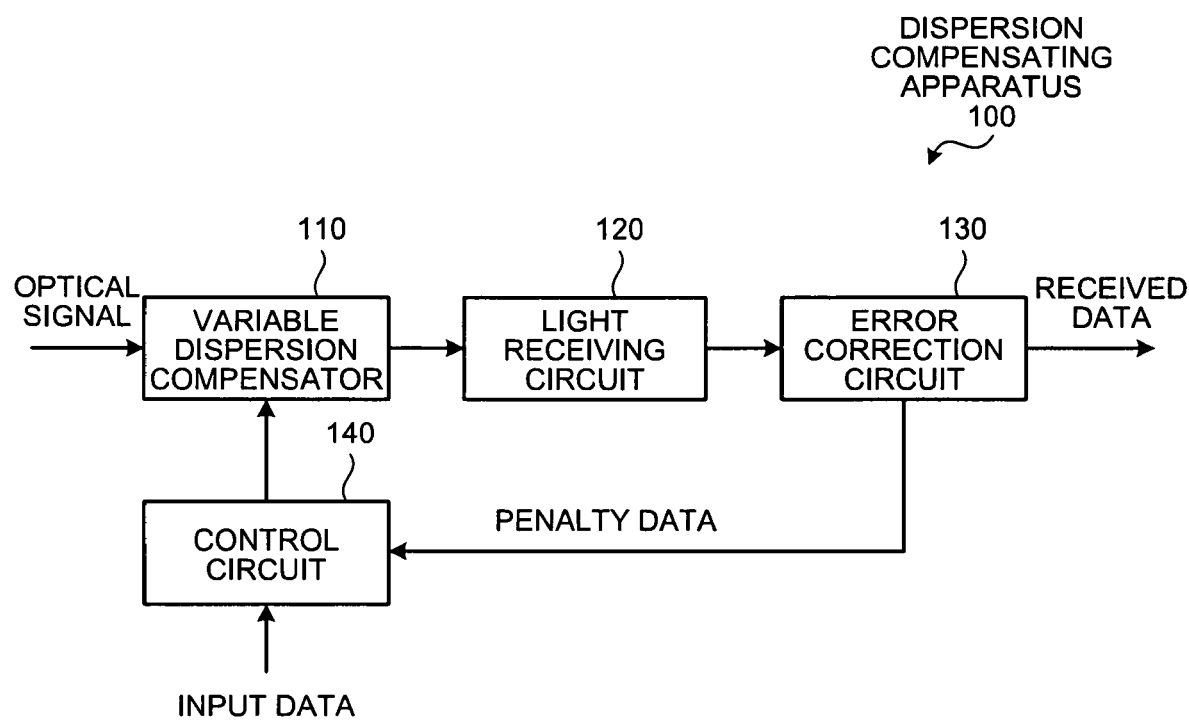
FIG. 1 is a block diagram of a dispersion compensating apparatus according to an embodiment of the present invention.

A configuration of the dispersion compensating apparatus according to the present embodiment is described below in greater detail. FIG. 1 is a block diagram of a dispersion compensating apparatus 100 according to the present embodiment. As shown in FIG. 1, the dispersion compensating apparatus 100 includes a variable dispersion compensator 110, a light receiving circuit 120, an error correction circuit 130, and a control circuit 140.

The variable dispersion compensator 110 is a known optical device that variably compensates wavelength dispersion of an optical signal. A VIPA dispersion compensator (see FIG. 15) or an optical device utilizing a fiber bragg grating (FBG) can be used as the variable dispersion compensator 110. In the present embodiment, a VIPA dispersion compensator is used as the variable dispersion compensator 110. The present invention is not limited thereto (an optical device utilizing an FBG can be also used as the variable dispersion compensator 110).

The light receiving circuit 120 receives an optical signal output from the variable dispersion compensator 110, converts the optical signal into an electric signal, performs known receiving processes such as clock recovery and data identification, then outputs a received data signal that represents a result of the receiving processes to the error correction circuit 130.

The error correction circuit 130 corrects the received data signal output from the light receiving circuit 120, and outputs the received data signal thus corrected thereby to an external device. The error correction circuit 130 measures data such as a penalty from the received data signal, and outputs the penalty thus measured thereby (hereinafter, "penalty data") to the control circuit 140. As a specific method for measuring a penalty, for example, a code error is determined by performing a parity check on the received data signal. Thus, a penalty can be measured.

Figure 2:
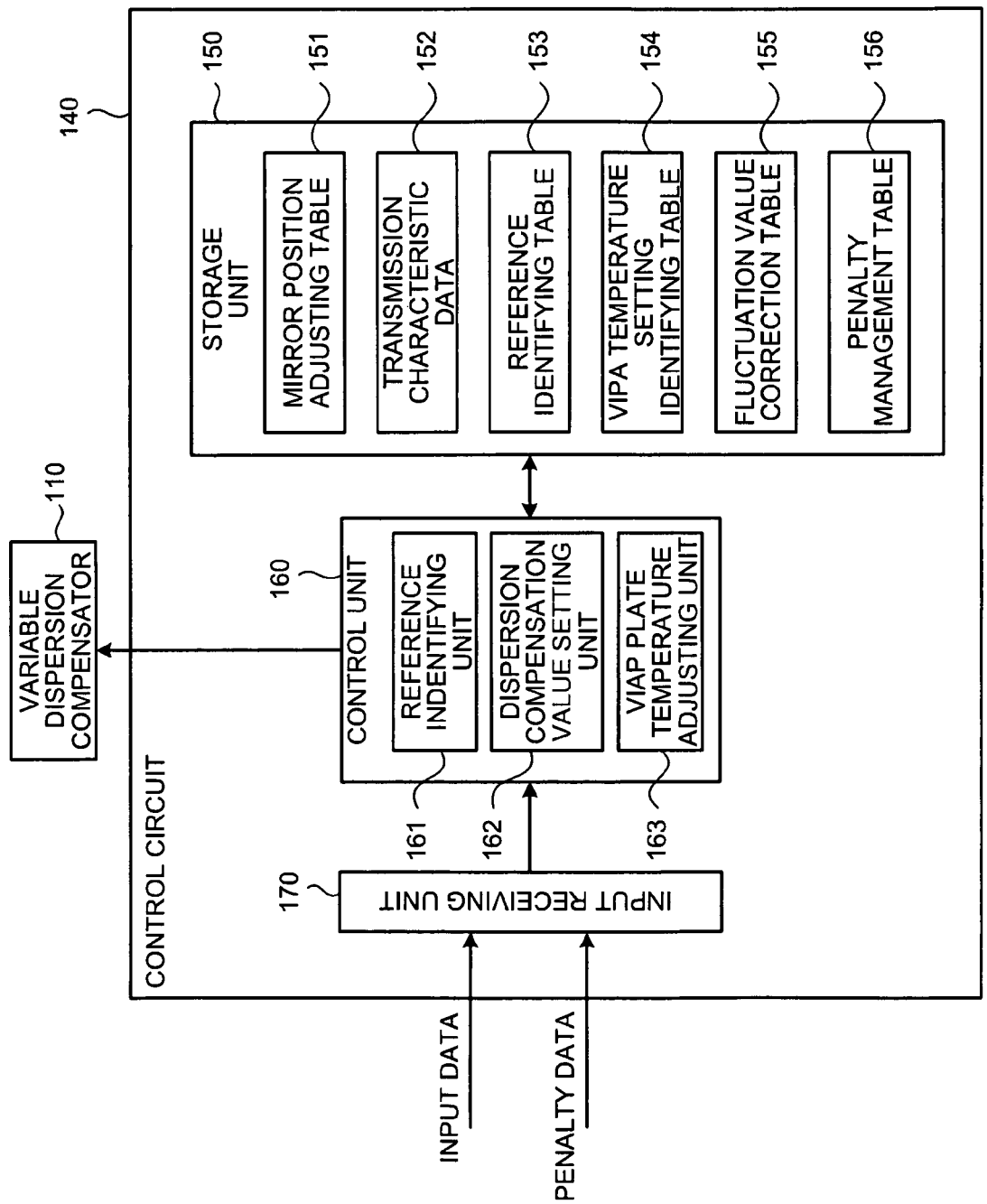
FIG. 2 is a functional block diagram of a control circuit shown in FIG. 1.

The control circuit 140 performs temperature adjustment of the VIPA plate 12 included in the variable dispersion compensator 110 (a refractive index of the VIPA plate 12 can be adjusted by adjusting temperature of the VIPA plate 12) and position adjustment of the free-form surface mirror (or the free surface mirror) 14. FIG. 2 is a block diagram of the control circuit 140. As shown in FIG. 2, the control circuit 140 includes a storage unit 150, a control unit 160, and an input receiving unit 170.

The storage unit 150 is a storage device for storing therein data and computer programs necessary for the various processes performed by the control unit 160. The storage unit 150 stores, as shown in FIG. 2, a mirror position adjusting table 151, a transmission characteristic data 152, a reference identifying table 153, a VIPA temperature setting identifying table 154, a fluctuation value correction table 155, and a penalty management table 156, as data closely related to the present invention.

Figure 3:
FIG. 3 is a diagram of an example of a mirror position adjusting table shown in FIG. 2.

The mirror position adjusting table 151 is a table of a relationship between a position of the free-form surface mirror (or free surface mirror) 14 (see FIG. 15) and the dispersion compensation value. FIG. 3 is a diagram of an example of the mirror position adjusting table 151. As shown in FIG. 3, in the mirror position adjusting table 151, positions of the free-form surface mirror (or free surface mirror) corresponding to dispersion compensation values are recorded.

Figure 4:
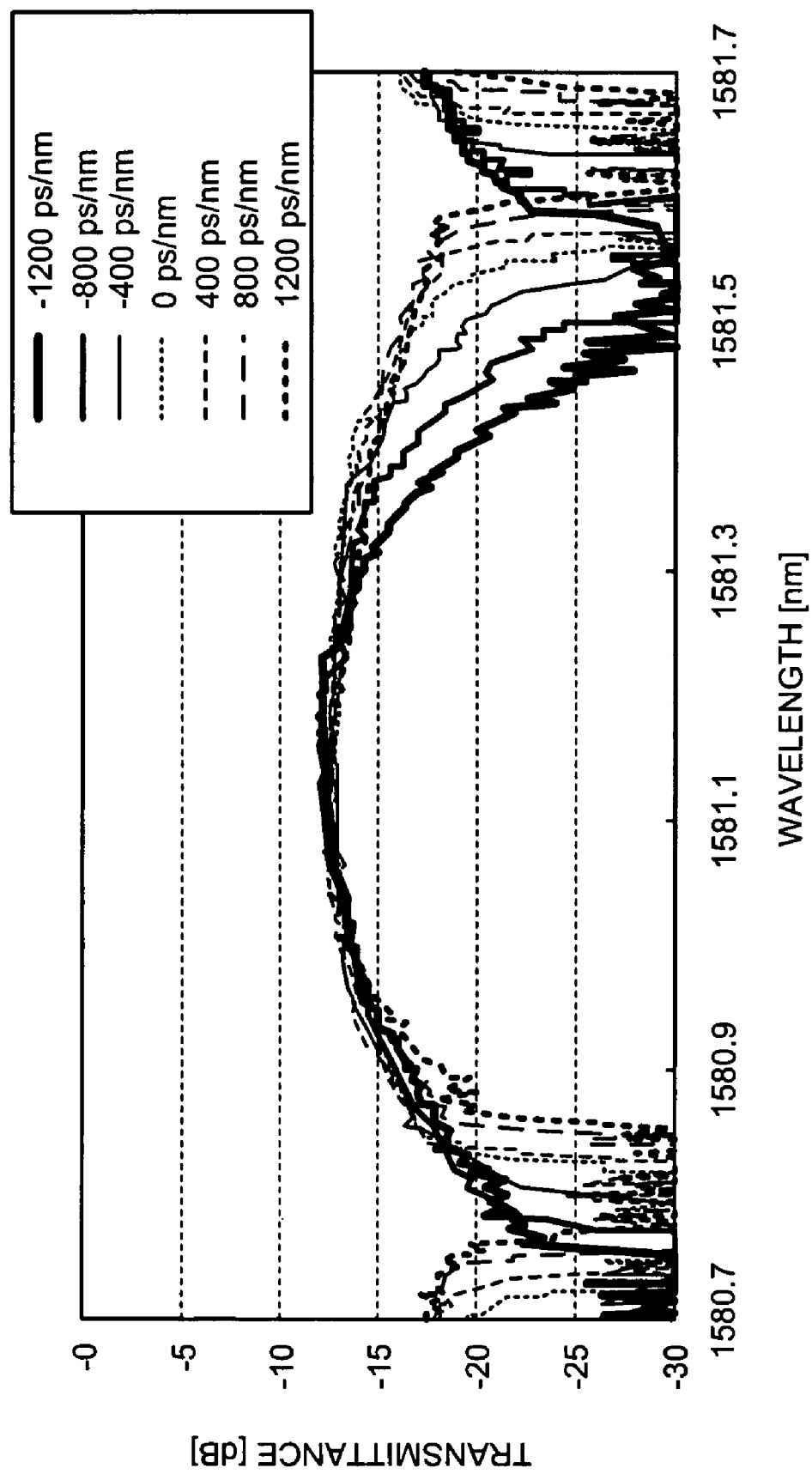
FIG. 4 is a diagram of an example of transmission characteristic data shown in FIG. 2.
Figure 15:
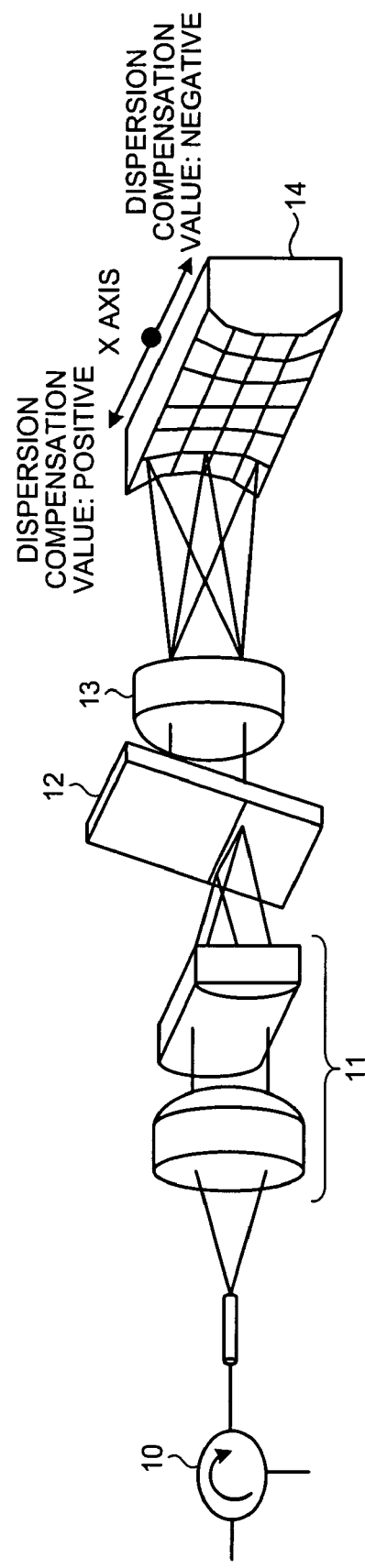
FIG. 15 is a schematic of a configuration of a VIPA dispersion compensator.

The transmission characteristic data 152 is data that shows a relationship between a wavelength and a transmittance of an optical signal at a predetermined outside air temperature and a predetermined temperature of the VIPA plate 12 (see FIG. 15). FIG. 4 is a diagram of an example of the transmission characteristic data 152. As shown in FIG. 4, transmission characteristics of an optical signal differ in accordance with dispersion compensation values.

Figure 5:
FIG. 5 is a diagram of an example of a reference identifying table shown in FIG. 2.

The reference identifying table 153 is a table in which optical signal information is associated with a reference optimal to the optical signal information, that is a reference for identifying a transmission center wavelength. FIG. 5 is a diagram of an example of the reference identifying table 153. As shown in FIG. 5, in the reference identifying table 153, an appropriate reference corresponding to a bit rate and a modulation method is recorded so that the reference is associated with the bit rate and the modulation method. A reference (X dB down) and a transmission center wavelength identified by the reference are described below in greater detail.

Figure 6:
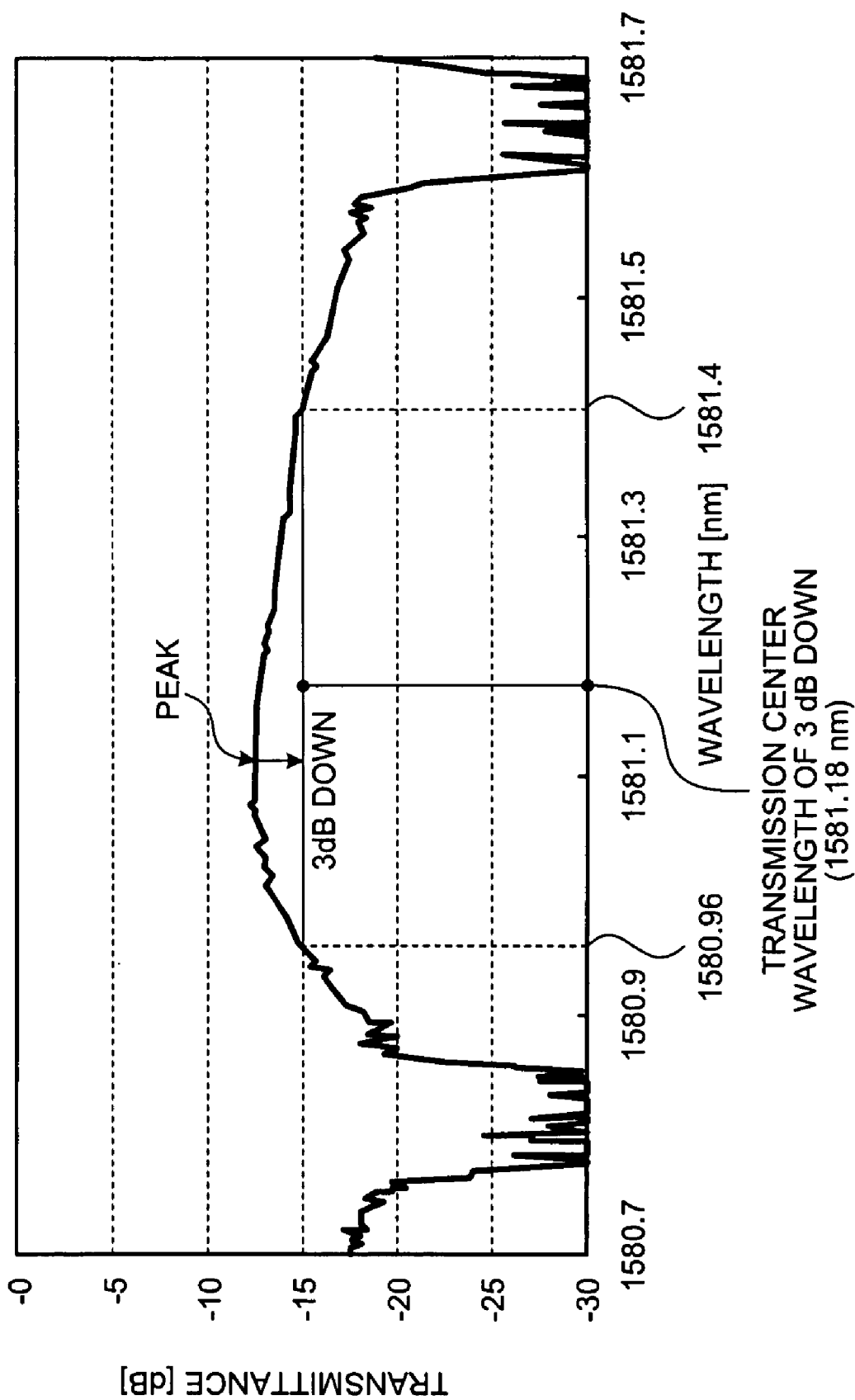
FIG. 6 is a diagram for additionally explaining a reference and a transmission center wavelength identified by the reference.

FIG. 6 is a diagram for additionally explaining a reference and a transmission center wavelength identified by the reference. Here, 3 dB down is described for simplicity. That a reference is 3 dB down means that the position lower by 3 dB than the peak value (the highest transmittance) of the transmission characteristic data is set to be a reference. For example, if the peak value of the transmission characteristic is −13 dB, a reference "3 dB down" means "−16 dB". References differ in accordance with the dispersion compensation value.

With reference to FIG. 6, a method for identifying a transmission center wavelength in accordance with a reference is described here in greater detail. First, it is assumed that a reference is 3 dB down. Wavelengths can be identified by obtaining intersections of the waveform corresponding to the transmission characteristic data and the transmittance of "−16 dB", and a transmission center wavelength can be calculated from the wavelength. More specifically, the intersections of the waveform corresponding to the transmission characteristic data and the transmittance "−16 dB" are "1580.96 nanometers" and "1581.4 nanometers". The center of the wavelength, that is "1581.18 nanometers" is calculated to be the transmission center wavelength. If the transmission characteristic of the optical signal is asymmetric with respect to the loss axis (an axis related to transmittance), a transmission center wavelength differs for each dispersion compensation value.

Figure 7:
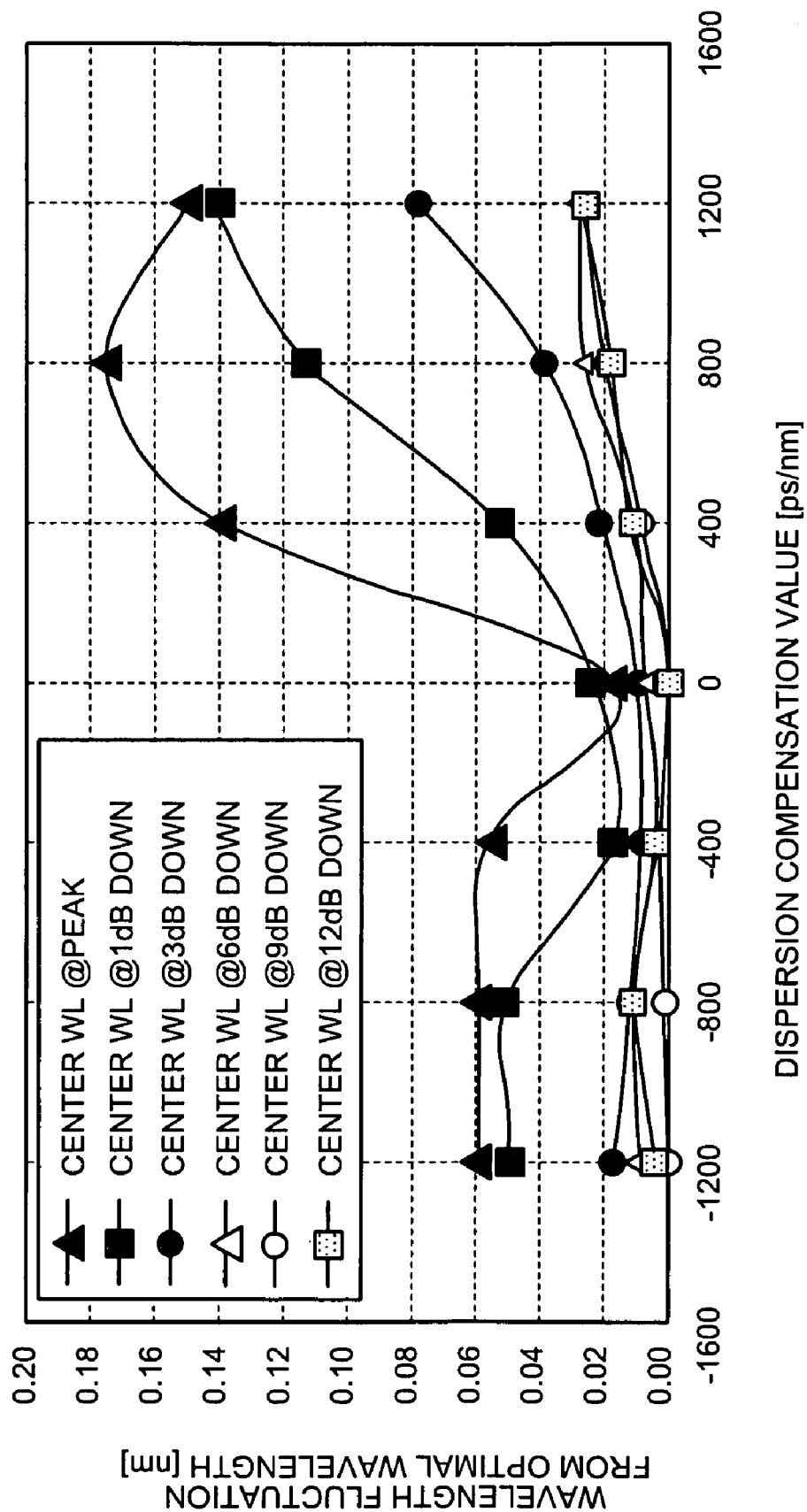
FIG. 7 is a diagram of a relationship between a dispersion compensation value and a fluctuation of the wavelength for given optical signal information.

A relationship between the dispersion compensation value and a wavelength fluctuation between a transmission center wavelength for each reference (the peak to 12 db down) and an optimal wavelength (a wavelength at which a penalty of a signal light is the smallest) is described here in greater detail. FIG. 7 is a diagram of a relationship between the dispersion compensation value for predetermined optical signal information and the wavelength fluctuation. In an example shown in FIG. 7, it can be appreciated that penalties are smaller in the transmission center wavelengths of 6 to 12 dB down. Therefore, a transmission center wavelength can be identified by using references of 6 to 12 dB down, and thus variable dispersion compensator 110 can be adjusted.

Characteristics shown in FIG. 7 differ for each of optical signal information. Therefore, by obtaining in advance differences (differences in each dispersion correction value) between a transmission center wavelength and an optimal center wavelength (a transmission center wavelength at which a penalty is lower than a predetermined value) corresponding to each reference for each optical signal information by experiment or simulation, an optimal reference (an optimal reference that makes a penalty lower than a predetermined value and that is 6 to 12 dB down in FIG. 7) for each piece of optical signal information can be obtained (see FIG. 5).

Returning to the description of FIG. 2, the VIPA temperature setting identifying table 154 is a table for identifying a temperature of the VIPA plate 12 so that fluctuations of a corresponding transmission center wavelength and a wavelength of the optical signal (a value defined by the ITU-T Grid) with respect to each reference are equal to each other. FIG. 8 is a diagram of an example of the VIPA temperature setting identifying table.

As shown in FIG. 8, for example, if the dispersion compensation value is "−1200", a VIPA plate temperature is "80 degrees centigrade", an outside air temperature is "25 degrees centigrade", and a fluctuation value is "$\Delta\lambda 1$", then a VIPA plate temperature is set to be "80 degrees centigrade+$\Delta\lambda 1$ multiple by A", wherein A is a constant that represents a transmission characteristic wavelength shift value per degree of temperature change in the VIPA plate. $\Delta\lambda 1$ to 7 shown in FIG. 8 are derived from the outside air temperature and the dispersion compensation value. For illustration purposes, only a temperature setting of the VIPA plate 12 according to a fluctuation value of transmission center wavelength wherein a reference is 6 dB down is described. The VIPA temperature setting identifying table 154, however, includes a relationship between a fluctuation value of a transmission center wavelength according to other references (X dB down) and a temperature of VIPA plate 12 also.

The fluctuation value correction table 155 is a table including information for correcting a fluctuation value (a fluctuation value between an optimal transmission center wavelength and transmission center wavelength for each reference) shown in the VIPA temperature setting identifying table 154. FIG. 9 is a diagram of an example of the fluctuation value correction table 155. As shown in FIG. 9, the fluctuation value correction table 155 stores therein a fluctuation value for an outside air temperature and the dispersion compensation value. A fluctuation value (see FIG. 8) shown in the VIPA temperature setting identifying table 154 is switched to a fluctuation value shown in the fluctuation value correction table when a outside air temperature and the dispersion compensation value are changed. For example, if an environment in which an outside air temperature is "25 degrees centigrade" and the dispersion compensation value is "−1200 nanometers" is changed into an environment in which an outside air temperature is "10 degrees centigrade" and the dispersion compensation value is "−1200 nanometers", the fluctuation value $\Delta\lambda 1$ shown in FIG. 8 is switched to the fluctuation value $\Delta\lambda 1$-1 shown in FIG. 9.

The penalty management table 156 is a diagram of a relationship between a fluctuation value $\Delta\lambda$ and a value of a filtering penalty (a value of a filtering penalty when a temperature of the VIPA plate 12 is not adjusted). FIG. 10 is a table of an example of the penalty management table 156. The penalty management table 156 is assumed to be obtained in advance, for example, by an experiment or a simulation of the optical signal.

Figure 11:
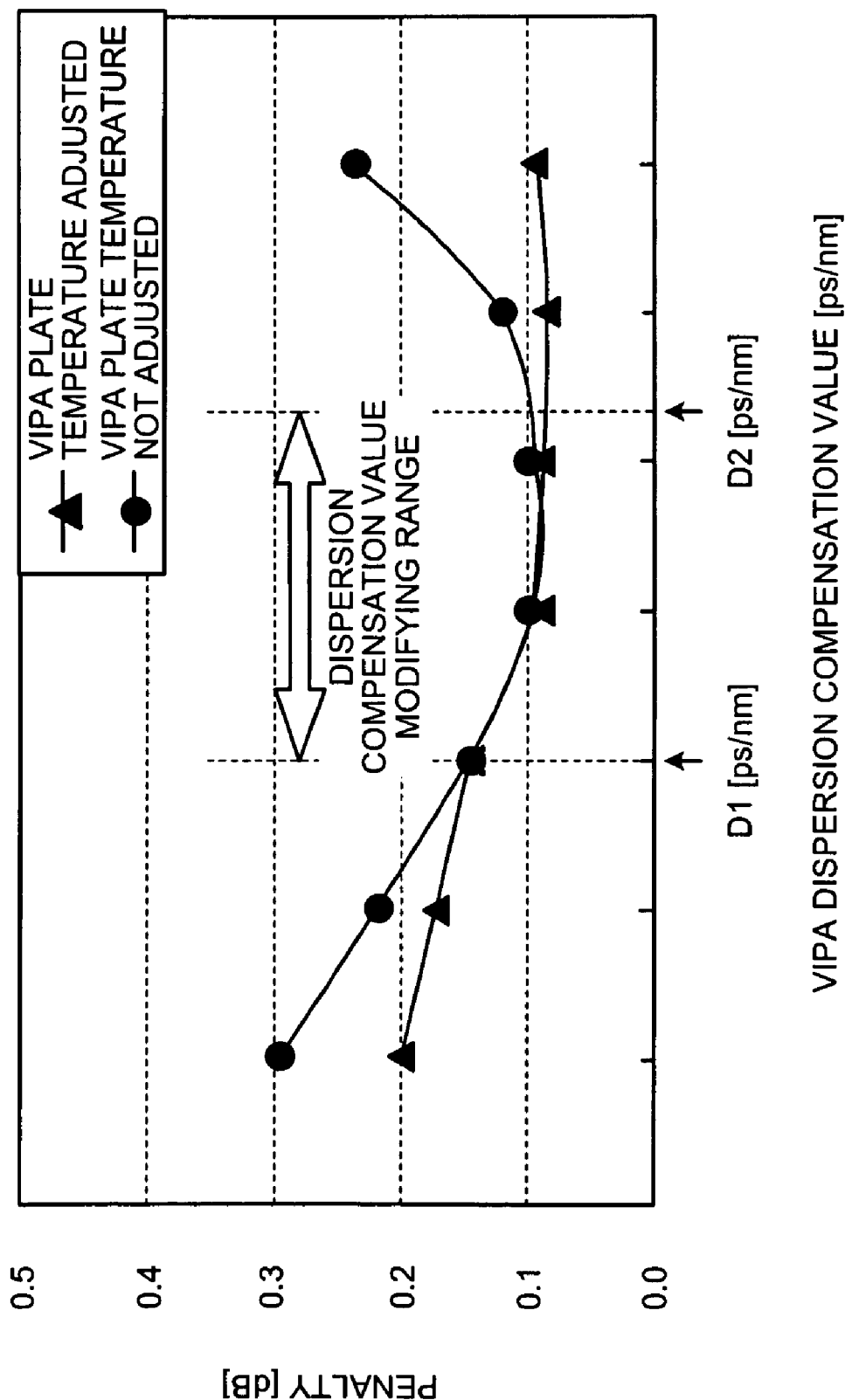
FIG. 11 is a diagram of a relationship between a penalty with a temperature of the VIPA plate adjusted according to changes of the dispersion compensating value and a penalty without such adjustment.

FIG. 11 is a diagram of a relationship between penalties with and without adjustment of a temperature of the VIPA plate 12 when the dispersion compensation value is changed. As shown in FIG. 11, as long as the dispersion compensation value varies within a predetermined range, both penalties with and without the temperature adjustment are almost the same in value. Considering that it takes minutes until a transmission wavelength is stably controlled when a temperature of the VIPA plate 12 is modified, a temperature of the VIPA plate 12 can be adjusted only if a difference between penalties with and without adjustment of a temperature of the VIPA plate 12 is more than a predetermined value. In other cases, a wavelength dispersion can be efficiently compensated by not changing a temperature of the VIPA plate 12.

A temperature of the VIPA plate 12 does not have to be changed also if a filtering penalty is less than an acceptable value when a temperature of the VIPA plate 12 is not adjusted according to a change of the dispersion compensation value.

Returning to the description of FIG. 2, the control unit 160 includes an internal memory that stores therein computer programs and control data that define various procedures, and is a controller for executing various processes. The control unit 160 includes a reference identifying unit 161, the dispersion compensation value setting unit 162, and a VIPA plate temperature adjusting unit 163, as components closely related to the present invention. Various data input to the control circuit 140 are input to the control unit 160 via the input receiving unit 170.

The reference identifying unit 161 obtains optical signal information, and then identifies a reference (X dB down) in accordance with the optical signal information thus obtained and the reference identifying table 153. An administrator of the dispersion compensating apparatus inputs the optical signal information to the dispersion compensating apparatus 100.

Figure 12:
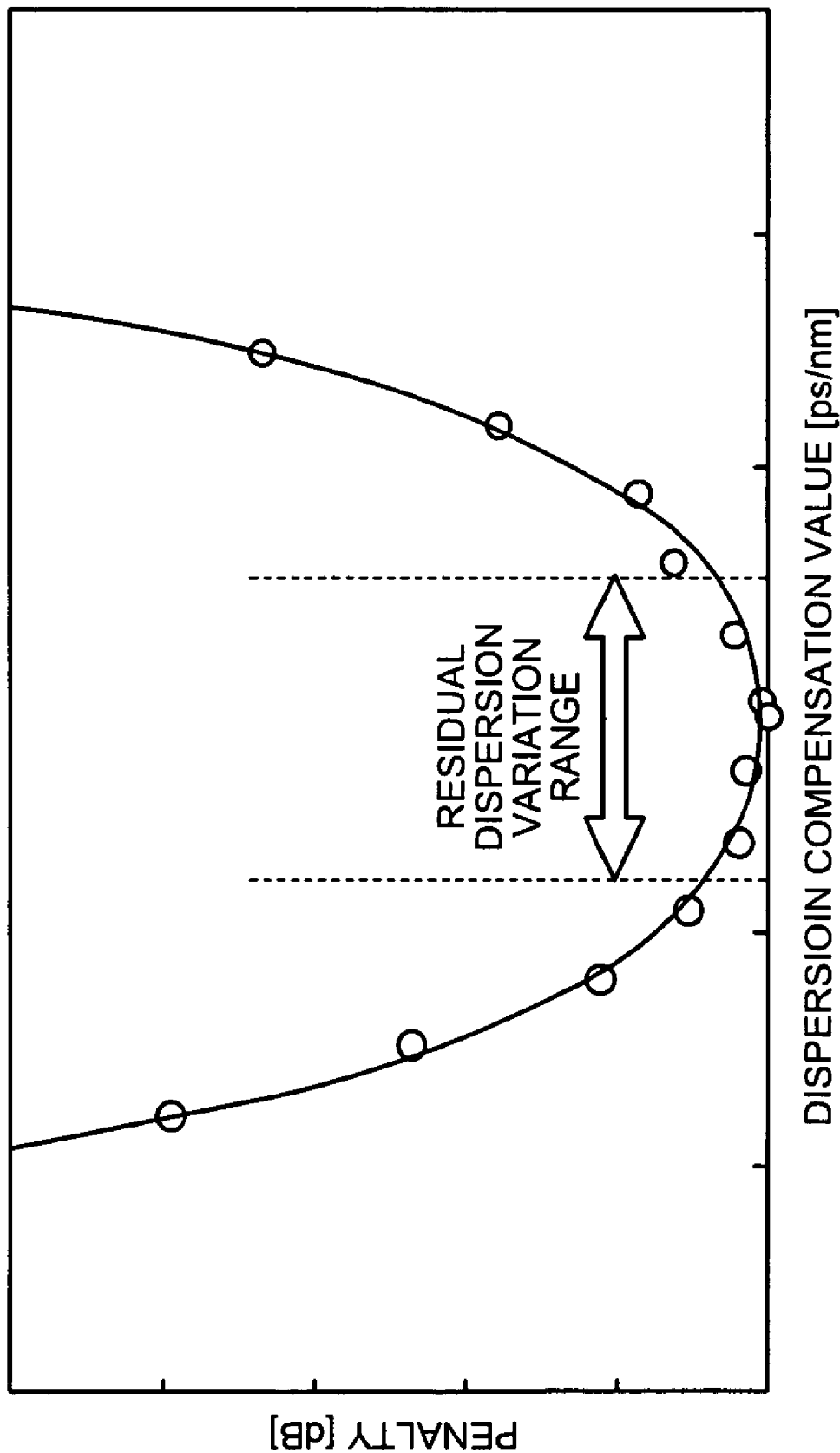
FIG. 12 is a diagram of a relationship between a residual dispersion value and a penalty.

The dispersion compensation value setting unit 162 obtains a penalty data from the error correction circuit 130, and adjusts the dispersion compensation value of the variable dispersion compensator 110 so that a value of a penalty is less than a predetermined value or the minimal. FIG. 12 is a diagram of a relationship between a residual dispersion value and a penalty. As shown in FIG. 12, the more a difference between a dispersion value of an optical signal and the dispersion compensation value according to the variable dispersion compensator 110 (that is a residual dispersion value) is deviated from an optimal value, for example a residual dispersion value of 0 np/nm, the higher the penalty is. The dispersion compensation value setting unit 162 adjusts the free-form surface mirror (or free surface mirror) 14 included in the variable dispersion compensator 110 so that a residual dispersion value is an optimal value.

A residual dispersion value cannot be calculated from the penalty data output from the error correction circuit 130. The dispersion compensation value setting unit 162, however, can set a residual dispersion value to be an optimal value by adjusting the free-form surface mirror 14 so that a penalty is the minimal value.

When the dispersion compensation value setting unit 162 changes the dispersion compensation value, the VIPA plate temperature adjusting unit 163 adjusts a temperature of the VIPA plate 12 so that the temperature of the VIPA plate 12 corresponds to the dispersion compensation value thus changed. By adjusting a temperature of the VIPA plate 12, a refractive index of the VIPA plate 12 can be adjusted. More specifically, the VIPA plate temperature adjusting unit 163 identifies a transmission center wavelength in accordance with a reference (X dB down) identified by the reference identifying unit 161, the dispersion compensation value set by the dispersion compensation value setting unit 162, and a transmission characteristic data, and calculates a fluctuation value between the transmission center wavelength and a center wavelength of the signal light defined by the ITU-T Grid.

The VIPA plate temperature adjusting unit 163 compares the fluctuation value thus calculated, an outside air temperature, and the dispersion compensation value with the VIPA temperature setting identifying table 154 and identifies a temperature of the VIPA plate 12, thereby adjusting a temperature of the VIPA plate 12.

The VIPA plate temperature adjusting unit 163 determines if a temperature of the VIPA plate 12 is adjusted by comparing, with the penalty management table 156, a fluctuation value between a transmission center wavelength identified by the dispersion compensation value modified by the dispersion compensation value setting unit 162 and a reference (X dB down) and a center wavelength of the signal light defined by the ITU-T Grid.

A temperature of the VIPA plate 12 is not adjusted if a penalty is lower than a predetermined value when a temperature of the VIPA plate 12 is not adjusted, or if a difference between penalties when a temperature of the VIPA plate 12 is adjusted and when a penalty of the VIPA plate 12 is not adjusted is lower than a predetermined value. Thus, The VIPA plate temperature adjusting unit 163 omits an unnecessary temperature adjustment of the VIPA plate 12. As a result, wavelength dispersion of an optical signal can be efficiently performed.

Figure 13:
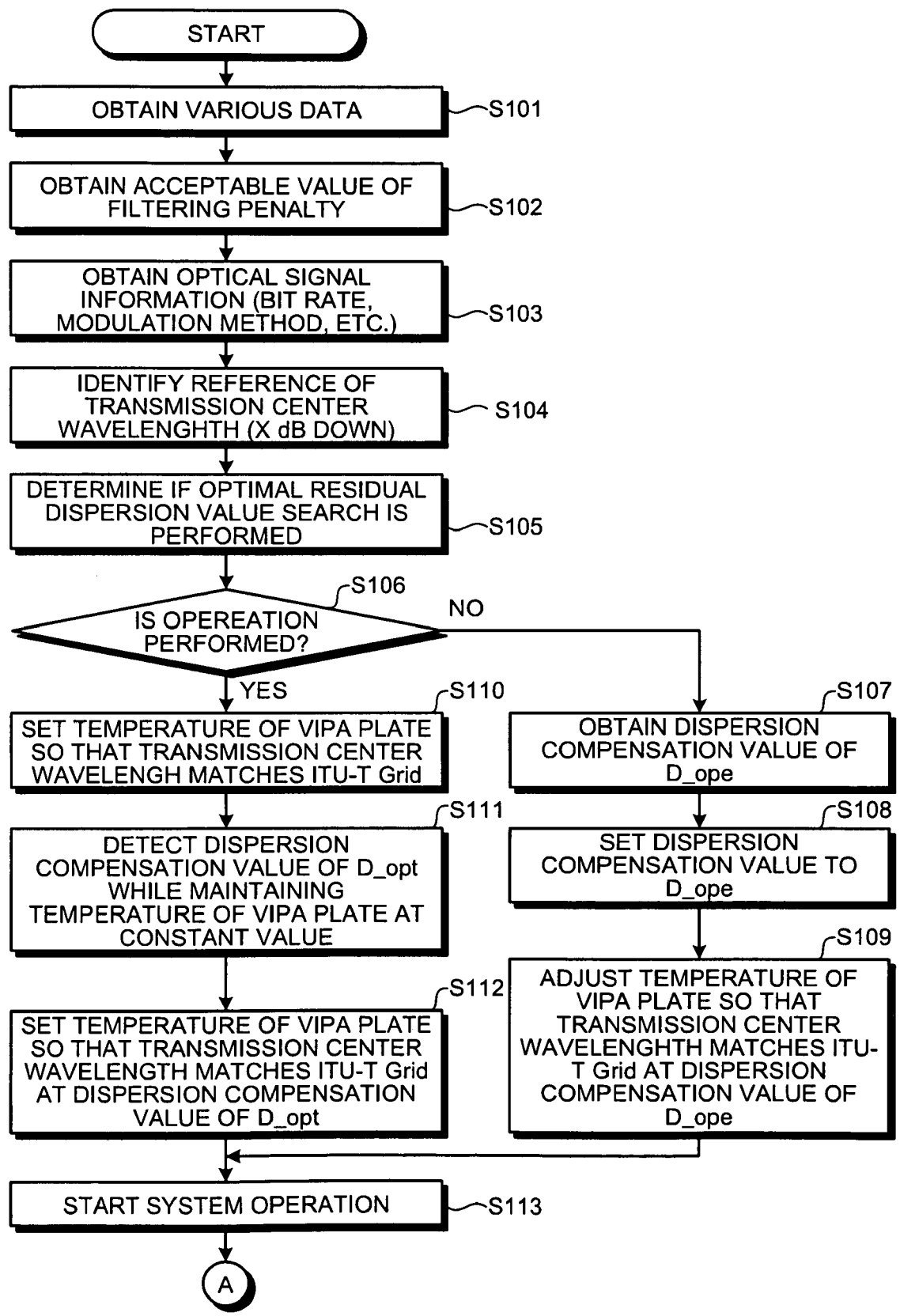
FIG. 13 is a flowchart of procedures performed by a dispersion compensating apparatus according to the present embodiment.
Figure 14:
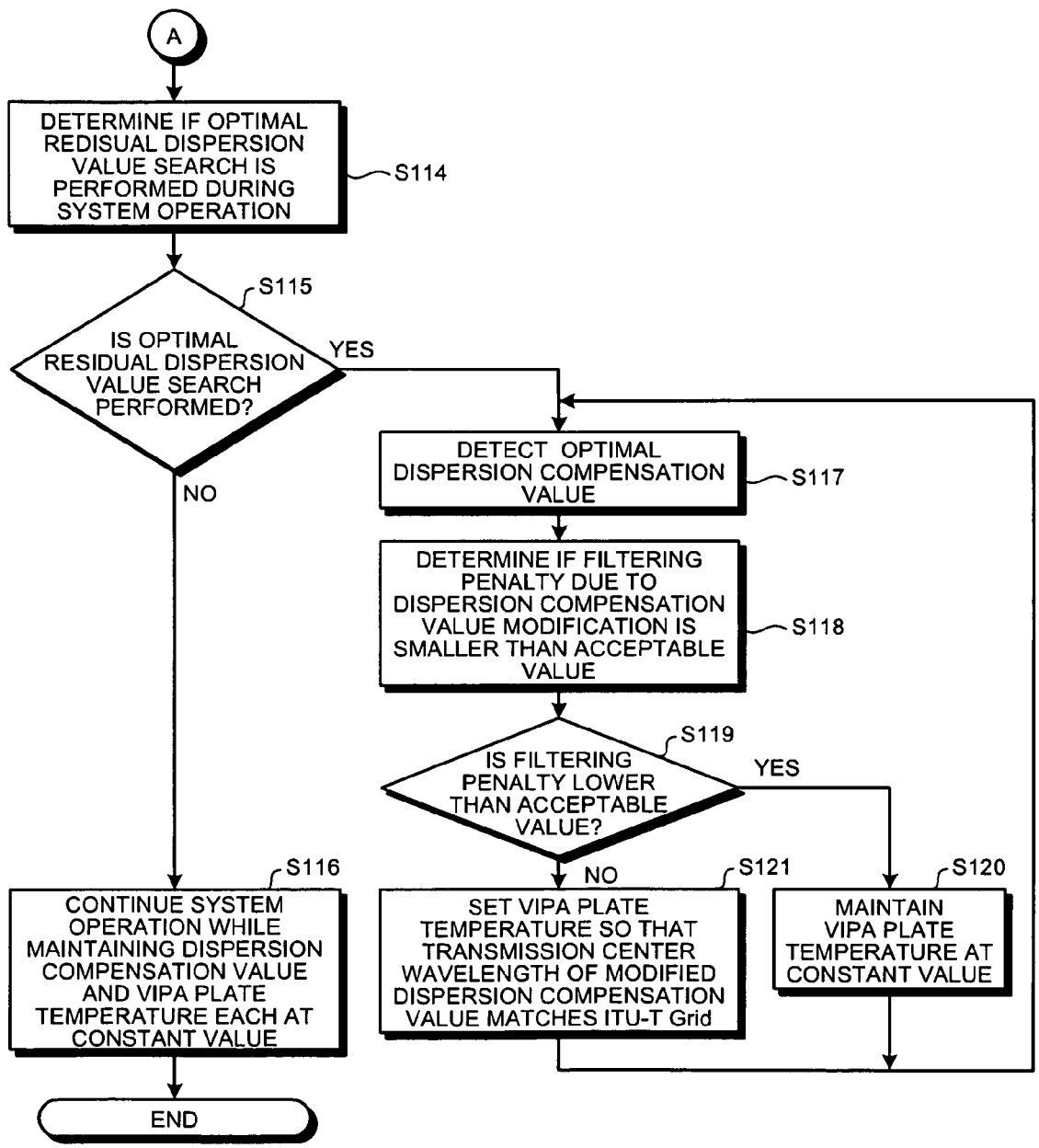
FIG. 14 is a flowchart of procedures performed by the dispersion compensating apparatus according to the present embodiment.

Processes performed by the dispersion compensating apparatus 100 according to the present embodiment are described here in greater detail. FIGS. 13 and 14 are flowcharts of procedures performed by the dispersion compensating apparatus 100 according to the present embodiment. As shown in FIGS. 13 and 14, the dispersion compensating apparatus 100 obtains various data (the mirror position adjusting table 151, the transmission characteristic data 152, the reference identifying table 153, the VIPA temperature setting identifying table 154, the fluctuation value correction table 155, and the penalty management table 156) and stores the data in the storage unit 150 (Step S101).

The VIPA plate temperature adjusting unit 163 obtains an acceptable value of a filtering penalty (Step S102), the reference identifying unit 161 obtains optical signal information (Step S103), the reference identifying unit 161 identifies a reference (X dB down) in accordance with the optical signal information (Step S104), and the dispersion compensating apparatus 100 determines if an optimal residual dispersion value search is performed (Step S105).

If the optimal residual dispersion value search is not performed (No at Step S106), the dispersion compensation value setting unit 162 obtains a predetermined dispersion compensation value of D_ope (Step S107), controls the variable dispersion compensator 110, and sets the dispersion compensation value to D_ope (Step S108).

The VIPA plate temperature adjusting unit 163 sets a temperature of the VIPA plate 12 so that a transmission center wavelength matches the wavelength defined by the ITU-T Grid at the dispersion compensation value of D_ope (Step S109), and the procedure goes to Step 113 (description of Step 113 will be described later).

If the optimal residual dispersion value search is performed (Yes at Step S106), however, the VIPA plate temperature adjusting unit 163 sets a temperature of the VIPA plate 12 so that a transmission center wavelength matches the wavelength defined by the ITU-T Grid at a certain dispersion compensation value (for example, 0 ps/nm) (Step S110).

The dispersion compensation value setting unit 162 detect the dispersion compensation value of D_opt that makes a penalty the smallest while a temperature of the VIPA plate 12 is maintained at a constant value (Step S111), the VIPA plate temperature adjusting unit 163 sets a temperature of the VIPA plate 12 so that a transmission center wavelength matches the wavelength defined by the ITU-T Grid at the dispersion compensation value of D_opt (Step S112), and thus operation of the system is started (Step S113).

The dispersion compensating apparatus 100 determines if an optimal dispersion value search is performed during the system operation (Step S114). If the optimal dispersion value search is determined not to perform (NO at Step S115), the dispersion compensating apparatus 100 continues the system operation while the dispersion compensation value and a VIPA plate temperature are maintained at a constant value, respectively (Step S116). Then, the dispersion compensating apparatus 100 terminates the procedure.

If the optimal dispersion value search is performed (YES at Step S115), however, the dispersion compensation value setting unit 162 detects an optimal dispersion compensation value (Step S117), the VIPA plate temperature adjusting unit 163 determines if a filtering penalty according to dispersion compensation value modification is smaller than an acceptable value (Step S118).

If the filtering penalty according to dispersion compensation value modification is smaller than the acceptable value (YES at Step S119), the VIPA plate temperature adjusting unit 163 maintains a temperature of the VIPA plate 12 at a constant value (Step S120), and the procedure goes to Step S117. If the filtering penalty according to dispersion compensation value modification is larger than the acceptable value (NO at Step S119), however, the VIPA plate temperature adjusting unit 163 adjusts a temperature of the VIPA plate 12 so that the dispersion compensation value thus modified matches the wavelength defined by the ITU-T Grid (Step S121), and the procedure goes to Step S117.

Thus, the reference identifying unit 161 identifies a reference in accordance with the optical signal information, and the dispersion compensation value setting unit 162 performs a residual dispersion value search. As a result, the variable dispersion compensator 110 can be efficiently adjusted.

As described above, in the dispersion compensating apparatus 100 according to the present embodiment, the reference identifying unit 161 identifies a reference (X dB down) that makes a penalty lower than a predetermined value in accordance with the optical signal information and the reference identifying table 153, and the VIPA plate temperature adjusting unit 163 adjusts a temperature of the VIPA plate 12 so that a transmission center wavelength derived from the reference matches the value defined by the ITU-T Grid. Therefore, the dispersion compensating apparatus 100 can efficiently compensate wavelength dispersion regardless of various characteristics of an optical signal.

In the dispersion compensating apparatus 100 according to the present embodiment, the VIPA plate temperature adjusting unit 163 determines whether a filtering penalty is lower than a predetermined value in accordance with the penalty management table 156 if the dispersion compensation value setting unit 162 performs an optimal residual dispersion value search, and temperature adjustment of the VIPA plate 12 is not performed if the filtering penalty is lower than the predetermined value. Thus, unnecessary temperature adjustment can be omitted. That is, a time period for which a transmission wavelength gets stably controlled can be omitted. As a result, the dispersion compensating apparatus 100 can efficiently compensate wavelength dispersion.

In the present embodiment, the VIPA plate temperature adjusting unit 163 adjusts a temperature of the VIPA plate 12, thereby modifying a refractive index of the VIPA plate 12. The present invention is, however, not limited thereto, and a refractive index of the VIPA plate 12 may be modified, for example, by applying a stress on the VIPA plate 12.

According to the embodiments of the present invention, wavelength dispersion that occurs in an optical signal can be efficiently compensated.

According to the embodiments of the present invention, wavelength dispersion that occurs in various types of optical signals can be appropriately compensated.

According to the embodiments of the present invention, unnecessary refractive index adjustment can be omitted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A dispersion compensating apparatus that compensates waveform degradation that occurs in an optical signal due to a dispersion characteristic of an optical transmission line by using an optical component that modifies a refractive index thereof with a change in one of temperature and stress applied thereon and changes a transmission wavelength characteristic of the optical signal, the dispersion compensating apparatus comprising:
   a reference value information recording unit that records therein reference value information indicating a plurality of reference values each corresponds to different characteristics of the optical signal;
   a reference value identifying unit that identifies a reference value corresponding to a characteristic of an optical signal whose wavelength is to be compensated;
   a transmission center wavelength identifying unit sets a reference position lower than a peak of the transmission characteristic data of the optical component by the identified reference value, and identifies a transmission center wavelength based on the set reference position; and
   a refractive index adjusting unit that adjusts the refractive index of the optical component in accordance with the identified transmission center wavelength.

2. The dispersion compensating apparatus according to claim 1, wherein the characteristics of the optical signal include at least one of a wavelength, a bit rate, a modulation method, and a wavelength interval of the optical signal.

3. The dispersion compensating apparatus according to claim 1, wherein the refractive index adjusting unit adjusts the refractive index of the optical component while maintaining a dispersion compensation value that represents a degree of compensation of the waveform degradation of the optical signal at a constant value.

4. A dispersion compensating apparatus that compensates waveform degradation that occurs in an optical signal due to a dispersion characteristic of an optical transmission line by using an optical component that modifies a refractive index thereof with a change in one of temperature and stress applied thereon and changes a transmission wavelength characteristic of the optical signal, the dispersion compensating apparatus comprising:
   an error rate information recording unit that records therein error rate information that represents error rates of the optical signal if a refractive index of the optical component is adjusted and not adjusted when a dispersion compensation value that represents a degree of compensation of waveform degradation of the optical signal is modified; and
   a refractive index adjusting unit that adjusts the refractive index of the optical component only if a difference between the recorded error rates is more than a predetermined value when the dispersion compensation value is modified.

5. A dispersion compensating method that compensates waveform degradation that occurs in an optical signal due to a dispersion characteristic of an optical transmission line by using an optical component that modifies a refractive index thereof with a change in one of temperature and stress applied thereon and changes a transmission wavelength characteristic of the optical signal, the dispersion compensating method comprising:
   recording reference value information indicating a plurality of reference values each corresponds to different characteristics of the optical signal;
   identifying a reference value corresponding to a characteristic of an optical signal whose wavelength is to be compensated;
   setting a reference position lower than a peak of the transmission characteristic data of the optical component by the identified reference value;
   identifying a transmission center wavelength based on the set reference position; and
   adjusting the refractive index of the optical component in accordance with the identified transmission center wavelength.

6. The dispersion compensating method according to claim 5, wherein the characteristics of the optical signal include at least one of a wavelength, a bit rate, a modulation method, and a wavelength interval of the optical signal.

7. The dispersion compensating method according to claim 5, further comprising adjusting the refractive index of the optical component while maintaining a dispersion compensation value that represents a degree of compensation of the waveform degradation of the optical signal at a constant value.

8. A dispersion compensating method that compensates waveform degradation that occurs in an optical signal due to a dispersion characteristic of an optical transmission line by using an optical component that modifies a refractive index thereof with a change in one of temperature and stress applied thereon and changes a transmission wavelength characteristic of the optical signal, the dispersion compensating method comprising:
   recording error rate information that represents error rates of the optical signal if a refractive index of the optical component is adjusted and not adjusted when a dispersion compensation value that represents a degree of compensation of waveform degradation of the optical signal is modified; and
   adjusting the refractive index of the optical component only if a difference between the recorded error rates is more than a predetermined value when the dispersion compensation value is modified.

* * * * *